US011151185B2

(12) United States Patent
Yeo et al.

(10) Patent No.: US 11,151,185 B2
(45) Date of Patent: *Oct. 19, 2021

(54) CONTENT RECOGNITION APPARATUS AND METHOD FOR OPERATING SAME

(71) Applicant: Samsung Electronics Co., Ltd., Suwon-si (KR)

(72) Inventors: Hae-Dong Yeo, Suwon-si (KR); Yoon-Hee Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

This patent is subject to a terminal disclaimer.

(21) Appl. No.: 16/066,910

(22) PCT Filed: Dec. 16, 2016

(86) PCT No.: PCT/KR2016/014806
§ 371 (c)(1),
(2) Date: Jun. 28, 2018

(87) PCT Pub. No.: WO2017/116052
PCT Pub. Date: Jul. 6, 2017

(65) Prior Publication Data
US 2019/0018846 A1 Jan. 17, 2019

(30) Foreign Application Priority Data
Dec. 28, 2015 (KR) .......................... 10-2015-0187949

(51) Int. Cl.
*G06F 16/30* (2019.01)
*G06F 16/43* (2019.01)
(Continued)

(52) U.S. Cl.
CPC .............. *G06F 16/43* (2019.01); *G06F 16/00* (2019.01); *G06F 16/40* (2019.01); *G06F 16/41* (2019.01);
(Continued)

(58) Field of Classification Search
CPC .......... G06F 16/40; G06F 16/00; G06F 16/41; G06F 16/43; G06F 16/683; G06F 16/783;
(Continued)

(56) References Cited

U.S. PATENT DOCUMENTS 8,938,089 B1 * 1/2015 Postelnicu ......... G06K 9/00751
382/100
8,953,836 B1 * 2/2015 Postelnicu ......... G06K 9/00758
382/100
(Continued)

FOREIGN PATENT DOCUMENTS

KR 10-2009-0002076 A 1/2009
KR 10-2014-0094629 A 7/2014
(Continued)

OTHER PUBLICATIONS

European Search Report dated Aug. 21, 2018, issued in European Application No. 16882001.1-1217.

*Primary Examiner* — Mahesh H Dwivedi
(74) *Attorney, Agent, or Firm* — Jefferson IP Law, LLP

(57) ABSTRACT

A method for operating a content recognition apparatus is disclosed. The method for operating a content recognition apparatus according to an embodiment may comprise the steps of: obtaining at least one of a video fingerprint and an audio fingerprint of content corresponding to a content recognition request; retrieving, in a video fingerprint database and an audio fingerprint database for at least one broadcast service signal, a video fingerprint or an audio fingerprint which matches at least one of the obtained video (Continued)

fingerprint and audio fingerprint; and providing content information corresponding to the retrieved video fingerprint or audio fingerprint.

2 Claims, 11 Drawing Sheets

(51) Int. Cl.
  *H04N 21/8358* (2011.01)
  *G06F 16/40* (2019.01)
  *G06F 16/00* (2019.01)
  *G06F 16/783* (2019.01)
  *G06F 16/683* (2019.01)
  *G06F 16/41* (2019.01)
  *G06K 9/00* (2006.01)
  *H04N 21/439* (2011.01)
  *H04N 21/44* (2011.01)

(52) U.S. Cl.
  CPC .......... *G06F 16/683* (2019.01); *G06F 16/783* (2019.01); *G06K 9/00711* (2013.01); *H04N 21/439* (2013.01); *H04N 21/44* (2013.01); *H04N 21/8358* (2013.01)

(58) Field of Classification Search
  CPC .. G06K 9/00711; H04N 21/439; H04N 21/44; H04N 21/8358
  See application file for complete search history.

(56) References Cited

U.S. PATENT DOCUMENTS

| | | | |
|---|---|---|---|
| 9,258,604 B1* | 2/2016 | Bilobrov | H04N 21/466 |
| 9,619,854 B1* | 4/2017 | Sharifi | H04N 21/4826 |
| 2009/0006337 A1* | 1/2009 | Cheung | G06F 16/785 |
| 2009/0043870 A1 | 2/2009 | Ikezoye et al. | |
| 2009/0049465 A1 | 2/2009 | Deng | |
| 2009/0052784 A1* | 2/2009 | Covell | G06F 16/783 |
| | | | 382/209 |
| 2010/0134693 A1 | 6/2010 | Lee et al. | |
| 2010/0318515 A1 | 12/2010 | Ramanathan et al. | |
| 2011/0078020 A1* | 3/2011 | LaJoie | G06F 16/683 |
| | | | 705/14.53 |
| 2011/0078729 A1* | 3/2011 | LaJoie | H04N 21/254 |
| | | | 725/36 |
| 2011/0247042 A1 | 10/2011 | Mallinson | |
| 2011/0261257 A1* | 10/2011 | Terry | G06K 9/00221 |
| | | | 348/515 |
| 2011/0289114 A1* | 11/2011 | Yu | H04N 21/4331 |
| | | | 707/769 |
| 2012/0257116 A1* | 10/2012 | Hendrickson | G06K 9/00751 |
| | | | 348/700 |
| 2013/0054645 A1 | 2/2013 | Bhagavathy et al. | |
| 2013/0160038 A1 | 6/2013 | Slaney et al. | |
| 2013/0205321 A1* | 8/2013 | Sinha | H04N 21/4147 |
| | | | 725/19 |
| 2013/0239163 A1 | 9/2013 | Kim et al. | |
| 2014/0130087 A1 | 5/2014 | Cho et al. | |
| 2014/0193027 A1* | 7/2014 | Scherf | G06F 16/783 |
| | | | 382/100 |
| 2014/0201774 A1* | 7/2014 | Neumeier | H04N 21/4532 |
| | | | 725/19 |
| 2014/0230002 A1* | 8/2014 | Kitazato | H04N 21/4316 |
| | | | 725/109 |
| 2014/0250450 A1* | 9/2014 | Yu | H04N 21/4331 |
| | | | 725/19 |
| 2014/0282670 A1* | 9/2014 | Sinha | H04N 21/4307 |
| | | | 725/19 |
| 2015/0082330 A1* | 3/2015 | Yun | H04N 21/26603 |
| | | | 725/14 |
| 2015/0189347 A1* | 7/2015 | Oztaskent | G06F 16/951 |
| | | | 725/32 |
| 2015/0199351 A1* | 7/2015 | Borenstein | G06F 16/783 |
| | | | 707/740 |
| 2015/0234814 A1 | 8/2015 | Ikezoye et al. | |
| 2015/0254497 A1* | 9/2015 | Jang | G06K 9/6201 |
| | | | 382/124 |
| 2015/0296250 A1* | 10/2015 | Casper | G06Q 30/0623 |
| | | | 725/34 |
| 2016/0132600 A1* | 5/2016 | Woodhead | G06F 16/7837 |
| | | | 707/754 |
| 2016/0188981 A1* | 6/2016 | Doerring | G06F 16/7834 |
| | | | 382/190 |
| 2016/0227261 A1* | 8/2016 | Neumeier | H04N 21/44008 |
| 2016/0337701 A1* | 11/2016 | Khare | H04N 21/812 |
| 2017/0017645 A1* | 1/2017 | Neumeier | H04N 21/8456 |
| 2017/0171609 A1* | 6/2017 | Koh | H04N 21/44008 |
| 2017/0371963 A1* | 12/2017 | Bilobrov | G06K 9/00744 |

FOREIGN PATENT DOCUMENTS

| | | |
|---|---|---|
| KR | 10-2015-0116191 A | 10/2015 |
| WO | 2013/015546 A2 | 1/2013 |
| WO | 2014/004914 A1 | 1/2014 |

* cited by examiner

CONTENT RECOGNITION APPARATUS AND METHOD FOR OPERATING SAME

CROSS-REFERENCE TO RELATED APPLICATION(S)

This application is a U.S. National Stage application under 35 U.S.C. § 371 of an International application number PCT/KR2016/014806, filed on Dec. 16, 2016, which is based on and claimed priority of a Korean patent application number 10-2015-0187949, filed on Dec. 28, 2015, in the Korean Intellectual Property Office, the disclosure of which is incorporated by reference herein in its entirety.

TECHNICAL FIELD

Various embodiments of the present disclosure relate to a content recognition apparatus for recognizing content, and a method for operating the same. For example, various embodiments of the present disclosure relate to a content recognition apparatus that, based on a video fingerprint and an audio fingerprint of content, recognizes content, and a method for operating the same.

BACKGROUND ART

Auto content recognition is a technique for recognizing content, which is being output.

More specifically, auto content recognition is a technique of recognizing content by converting real-time broadcast or recorded video into a digital format, extracting audio information or video information, and comparing the same with real-time broadcast or recorded video.

Auto content recognition is classified into a finger printing method and a watermarking method.

The fingerprinting method is intended to recognize content by extracting audio or video data contained in the content and by comparing the same with audio data or video data in a database.

The watermarking method is intended to recognize content by inserting a sound in a range that is imperceptible to a user in the content or by adding an image code that is imperceptible to the user thereto.

DETAILED DESCRIPTION OF THE INVENTION

Technical Problem

When comparing audio or video data of content to be recognized with audio data or video data in a database in the fingerprinting method of the auto content recognition method, it is difficult to recognize the content if the same image or the same audio is included in several pieces of content. In particular, when the same image is provided from several channels, when the same music is repeatedly reproduced, or when the content is in a mute state, the content cannot be distinguished.

Thus, there is a need for an efficient content recognition apparatus for recognizing content that is indistinguishable by means of a single video or audio solution and a method for operating the same.

In various embodiments of the present disclosure, it is possible to accurately recognize content using a video fingerprint and an audio fingerprint of content requested for recognition.

In various embodiments of the present disclosure, in the case where one of a video fingerprint and an audio fingerprint is in the multi-matching state, content can be recognized using both the video fingerprint and the audio fingerprint.

Further, in various embodiments of the present disclosure, it is determined whether or not one of a video fingerprint and an audio fingerprint is in the multi-matching state, thereby efficiently utilizing resources for content recognition.

Technical Solution

In various embodiments of the present disclosure, a method for operating a content recognition apparatus may include: obtaining at least one of a video fingerprint and an audio fingerprint of content corresponding to a content recognition request; retrieving a video fingerprint or an audio fingerprint, which matches at least one of the obtained video fingerprint and audio fingerprint, from a video fingerprint database and an audio fingerprint database for at least one broadcast service signal; and providing content information corresponding to the retrieved video fingerprint or audio fingerprint.

In various embodiments of the present disclosure, a method for operating a content recognition apparatus may include: receiving at least one broadcast service signal; generating a video fingerprint and an audio fingerprint for the at least one broadcast service signal; determining whether or not at least one of the generated video fingerprint and audio fingerprint is in the multi-matching state; and, based on the determination result, storing at least one of the generated video fingerprint and audio fingerprint.

In various embodiments of the present disclosure, a content recognition apparatus may include: a data storage module configured to store a video fingerprint database and an audio fingerprint database for at least one broadcast service signal; and a content matching module configured to obtain at least one of a video fingerprint and an audio fingerprint of content corresponding to a content recognition request, configured to retrieve a video fingerprint or an audio fingerprint, which matches at least one of the obtained video fingerprint and audio fingerprint, from a video fingerprint database and an audio fingerprint database stored in the data storage module, and configured to provide content information corresponding to the retrieved video fingerprint or audio fingerprint.

In various embodiments of the present disclosure, a content recognition apparatus may include: an image input module configured to receive at least one broadcast service signal; an indexing module configured to generate a video fingerprint and an audio fingerprint for the at least one broadcast service signal and configured to determine whether or not at least one of the generated video fingerprint and audio fingerprint is in the multi-matching state; and a data module configured to store at least one of the generated video fingerprint and audio fingerprint.

Advantageous Effects

According to various embodiments of the present disclosure, the content recognition apparatus can recognize content, which cannot be recognized only by a video fingerprint or an audio fingerprint, thereby providing accurate content information on the content. In addition, the present disclosure can perform a matching operation for each of the video fingerprint and audio fingerprint, thereby increasing a content recognition rate and shortening a content recognition time. Further, the present disclosure can store both the video fingerprint and the audio fingerprint only for a section or multi-matching content in which one of either the video fingerprint or the audio fingerprint is in the multi-matching state, thereby reducing the use amount of a resource such as a processor and a memory.

MODE FOR CARRYING OUT THE INVENTION

Figure 1:
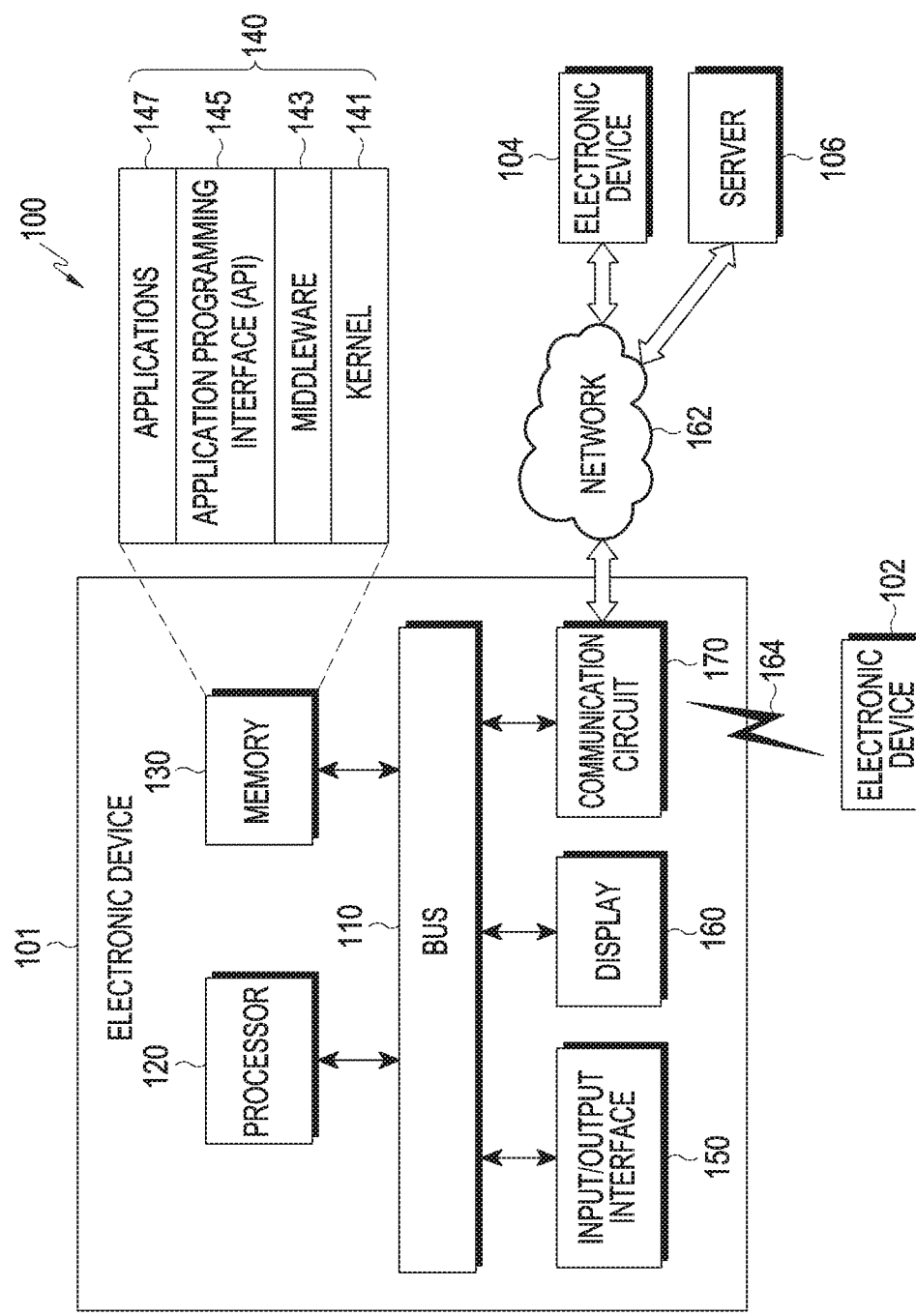
FIG. 1 illustrates a block diagram of an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device or the server may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a block diagram of an electronic device and a network according to various embodiments of the present disclosure.

Referring to FIG. 1, an electronic device 101 in a network environment 100 is disclosed in various embodiments of the present disclosure. The electronic device 101 may include a bus 110, a processor 120, a memory 130, an input/output interface 150, a display 160, and a communication module 170. In some embodiments, the electronic device 101 may exclude at least one of the above elements, or may further include other elements in addition thereto.

The bus 110, for example, may include a circuit for connecting the elements 110 to 170 with each other and transferring communication (e.g., control messages and/or data) between the elements.

The processor 120 may include at least one of a central processing unit (CPU), an application processor (AP), or a communication processor (CP). The processor 120, for example, may perform a calculation or data processing in relation to control and/or communication of one or more other elements of the electronic device 101.

The memory 130 may include a volatile and/or non-volatile memory. For example, the memory 130 may store commands or data in relation to one or more other elements of the electronic device 101. According to an embodiment, the memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an "operating system (OS)".

The kernel 141, for example, may control or manage system resources (e.g., the bus 110, the processor 120, the memory 130, or the like), which are used to execute operations or functions that are implemented in other programs (e.g., the middleware 143, the API 145, or the application programs 147). In addition, the kernel 141 may provide an interface by which the middleware 143, the API 145, or the application programs 147 may access respective elements of the electronic device 101, thereby controlling or managing system resources.

The middleware 143, for example, may play the intermediate role between the API 145 or the application programs 147 and the kernel 141 to communicate with each other for transmission and reception of data.

The middleware 143 may process one or more operation requests received from the application programs 147 according to priority. For example, the middleware 143 may give priority for using the system resources (e.g., the bus 110, the processor 120, the memory 130, or the like) of the electronic device 101 to at least one of the application programs 147. For example, the middleware 143 may perform scheduling or load balancing for one or more operation requests by processing the one or more operation requests according to the priority given to at least one of the application programs.

The API 145, for example, may be an interface by which the applications 147 control functions provided by the kernel 141 or the middleware 143. For example, the API 145 may include one or more interfaces or functions (e.g., instructions) for file control, window control, image processing, text control, or the like.

The input/output interface 150, for example, may play the role of an interface that transfers commands or data received from a user or other external devices to other elements of the electronic device 101. In addition, the input/output interface 150 may output commands or data received from the other elements of the electronic device 101 to the user or other external devices.

The display 160, for example, may include a liquid crystal display (LCD), a light-emitting diode (LED) display, an organic light-emitting diode (OLED) display, a microelectromechanical systems (MEMS) display, or an electronic paper display. For example, the display 160 may display a variety of content (e.g., text, images, videos, icons, symbols, or the like) to the user. The display 160 may include a touch screen, and may receive a touch input, a gesture input, a proximity input, or a hovering input by using electronic pens or a user's body part.

The communication module 170, for example, may establish communication between the electronic device 101 and external devices (e.g., a first external electronic device 102, a second external electronic device 104, or a server 106). For example, the communication module 170 may be connected to the network 162 through wireless communication or wired communication in order to thereby communicate with external devices (e.g., the second external electronic device 104 or the server 106).

For example, the wireless communication may use, as a cellular communication protocol, at least one of LTE (Long-Term Evolution), LTE-A (LTE Advance), CDMA (Code Division Multiple Access), WCDMA (Wideband CDMA), a UMTS (Universal Mobile Telecommunications System), WiBro (Wireless Broadband), a GSM (Global System for Mobile Communications), or the like. In addition, the wireless communication, for example, may include a short-range communication 164. The short-range communication 164, for example, may include at least one of Wi-Fi (Wireless Fidelity), Bluetooth, NFC (Near Field Communication), or a GNSS (Global Navigation Satellite System). The GNSS, for example, may include at least one of a GPS (Global Positioning System), a GLONASS (Global Navigation Satellite System), the Beidou Navigation Satellite System (hereinafter, "Beidou"), Galileo, or the European global satellite-based navigation system according to the usage area or bandwidth. Hereinafter, "GPS" may be used interchangeably with "GNSS" in the present specification. For example, the wired communication may include at least one of a USB (Universal Serial Bus), an HDMI (High-Definition Multimedia Interface), RS-232 (Recommended Standard 232), or a POTS (Plain Old Telephone Service). The network 162 may include at least one of the telecommunication networks, such as a computer network (e.g., LAN or WAN), the Internet, or a telephone network.

The first external device 102 and the second external device 104 may be the same as, or different from, the electronic device 101 as to the type thereof. According to an embodiment, the server 106 may include a group of one or more servers. According to various embodiments, at least some or all of the operations that are executed in the electronic device 101 may be executed by one or more other electronic devices (e.g., the electronic device 102 or 104, or the server 106). According to an embodiment, in the case where the electronic device 101 executes specific functions or services automatically or upon request, the electronic device 101 may make a request to the other devices (e.g., the electronic device 102 or 104, or the server 106) for at least some of the functions related to the same, instead of executing the functions or services by itself, or in addition thereto. The other electronic devices (e.g., the electronic device 102 or 104, or the server 106) may execute the requested functions or additional functions, and may transfer the result thereof to the electronic device 101. The electronic device 101 may provide the requested functions or services by providing the result without further processing or by additionally processing the same. To this end, for example, cloud computing, distributed computing, or client-server computing technology may be used.

Figure 2:
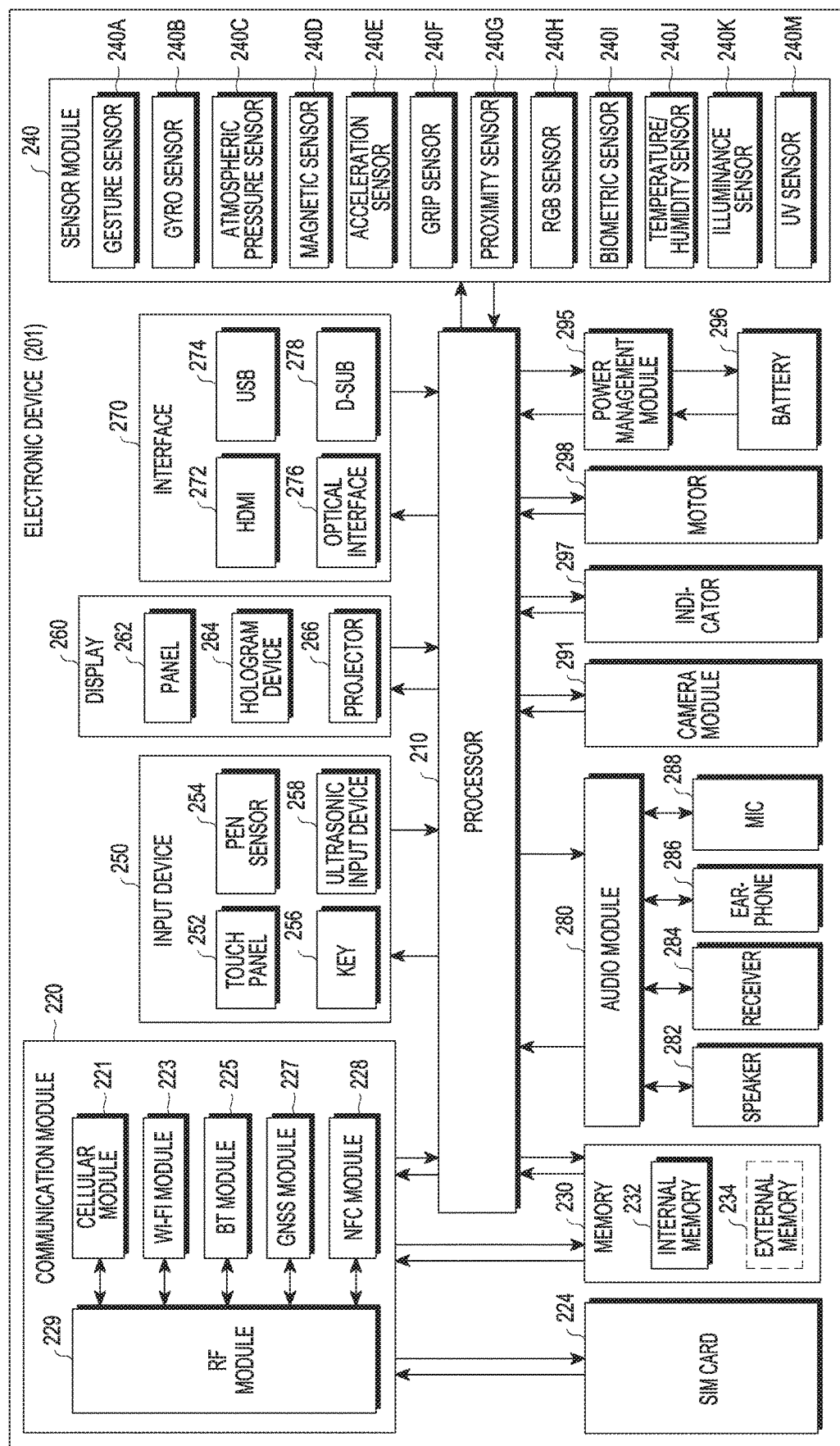
FIG. 2 is a block diagram of an electronic device according to various embodiments of the present disclosure.

FIG. 2 is a block diagram of an electronic device 201 according to various embodiments. The electronic device 201, for example, may include all or some of the elements of the electronic device 101 shown in FIG. 1. The electronic device 201 may include one or more processors {e.g., application processors (AP)} 210, a communication module 220, a subscriber identification module 224, a memory 230, a sensor module 240, an input device 250, a display 260, an interface 270, an audio module 280, a camera module 291, a power management module 295, a battery 296, an indicator 297, or a motor 298.

The processor 210, for example, may control a multitude of hardware or software elements connected with the processor 210, and may perform processing of various pieces of data and a calculation by executing an operating system or application programs. The processor 210 may be implemented by, for example, a system on chip (SoC). According to an embodiment, the processor 210 may further include a graphic processing unit (GPU) and/or an image signal processor. The processor 210 may include at least some (e.g., the cellular module 221) of the elements shown in FIG. 2. The processor 210 may load commands or data received from one or more other elements (e.g., a non-volatile memory) to a volatile memory to then process the same, and may store a variety of data in a non-volatile memory.

The communication module 220 may have a configuration the same as or similar to that of the communication module 170 of FIG. 1. The communication module 220, for example, may include a cellular module 221, a Wi-Fi module 223, a Bluetooth module 225, a GNSS module 227 (e.g., a GPS module, a Glonass module, the Beidou module, or the Galileo module), an NFC module 228, and a radio frequency (RF) module 229.

The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP).

For example, each of the Wi-Fi module 223, the Bluetooth module 225, the GNSS module 227, or the NFC module 228 may include a processor for processing data transmitted and received through a corresponding module. According to some embodiments, at least some (e.g., two or more) of the cellular module 221, the Wi-Fi module 223, the Bluetooth module 225, the GNSS module 227, or the NFC module 228 may be included in a single integrated chip (IC) or IC package.

The RF module 229, for example, may transmit and receive communication signals (e.g., RF signals). The RF module 229 may include, for example, a transceiver, a power amp module (PAM), a frequency filter, a low-noise amplifier (LNA), antennas, or the like. According to another embodiment, at least one of the cellular module 221, the Wi-Fi module 223, the Bluetooth module 225, the GNSS module 227, or the NFC module 228 may transmit and receive RF signals through a separate RF module.

The subscriber identification module 224, for example, may include a card including a subscriber identification module and/or an embedded SIM, and may contain inherent identification information {e.g., an integrated circuit card identifier (ICCID)} or subscriber information {e.g., an international mobile subscriber identity (IMSI)}.

The memory 230 (e.g., the memory 130) may include an internal memory 232 or an external memory 234. The internal memory 232, for example, may include at least one of volatile memories {e.g., a dynamic RAM (DRAM), a static RAM (SRAM), a synchronous dynamic RAM (SDRAM), or the like} or non-volatile memories {e.g., an one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like}.

The external memory 234 may include a flash drive, and may further include, for example, compact flash (CF), secure digital (SD), micro secure digital (Micro-SD), mini secure digital (Mini-SD), extreme digital (xD), a multi-media card (MMC), a memory stick, or the like. The external memory 234 may be functionally and/or physically connected with the electronic device 201 through any of various interfaces.

The sensor module 240, for example, may measure physical quantities or may detect the operation state of the electronic device 201, thereby converting the measured or detected information to electric signals. The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a color sensor 240H {e.g., a red-green-blue (RGB) sensor}, a biometric sensor 240I, a temperature/humidity sensor 240J, an illuminance sensor 240K, or an ultra-violet (UV) sensor 240M. Additionally or alternatively, the sensor module 240, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240, thereby controlling the sensor module 240 while the processor 210 is in a sleep mode.

The input device 250, for example, may include a touch panel 252, a (digital) pen sensor 254, keys 256, or an ultrasonic input device 258. The touch panel 252 may use at least one of, for example, a capacitive type, a pressure-sensitive type, an infrared type, or an ultrasonic type. In addition, the touch panel 252 may further include a control circuit. The touch panel 252 may further include a tactile layer in order to provide a user with a tactile reaction.

For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through a microphone (e.g., a microphone 288), thereby identifying data corresponding to the detected ultrasonic waves.

The display 260 (e.g., the display 160) may include a panel 262, a hologram device 264, or a projector 266. The panel 262 may include the same or a similar configuration as the display 160 of FIG. 1. The panel 262 may be implemented to be, for example, flexible, transparent, or wearable. The panel 262 may be configured with the touch panel 252 as a single module. The hologram device 264 may display 3D images in the air using light interference. The projector 266 may display images by projecting light onto a screen. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (UBS) 274, an optical interface 276, or a D-sub-miniature (D-sub) interface 278. The interface 270 may be included in, for example, the communication module 170 shown in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may convert a sound into an electric signal, and vice versa. At least some elements of the audio module 280 may be included, for example, in the input/output interface 150 shown in FIG. 1. For example, the audio module 280 may process voice information that is input or output through a speaker 282, a receiver 284, earphones 286, or a microphone 288.

The camera module 291, for example, may be a device for photographing still and moving images, and, according to an embodiment, the camera module 291 may include one or more image sensors (e.g., a front sensor or a rear sensor), lenses, an image signal processor (ISP), or a flash (e.g., an LED or a xenon lamp).

The power management module 295, for example, may manage the power of the electronic device 201. According to an embodiment, the power management module 295 may include a power management integrated circuit (PMIC), a charger integrated circuit (IC), or a battery or fuel gauge. The PMIC may be implemented by a wired charging type and a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be further included. The battery gauge may measure, for example, the remaining power of the battery 296, a charging voltage, current, or temperature. The battery 296 may include, for example, a rechargeable battery and/or a solar battery.

The indicator 297 may display a specific state (e.g., a booting state, a message state, or a charging state) of the whole or a part (e.g., the processor 210) of the electronic device 201. The motor 298 may convert an electric signal to a mechanical vibration, and may provide a vibration or a haptic effect. Although it is not shown in the drawing, the electronic device 201 may include a processing device (e.g., a GPU) for supporting mobile TV. The processing device for supporting mobile TV may process media data according to standards, such as, for example, digital multimedia broadcasting (DMB), digital video broadcasting (DVB), or mediaFlo™.

Figure 3:
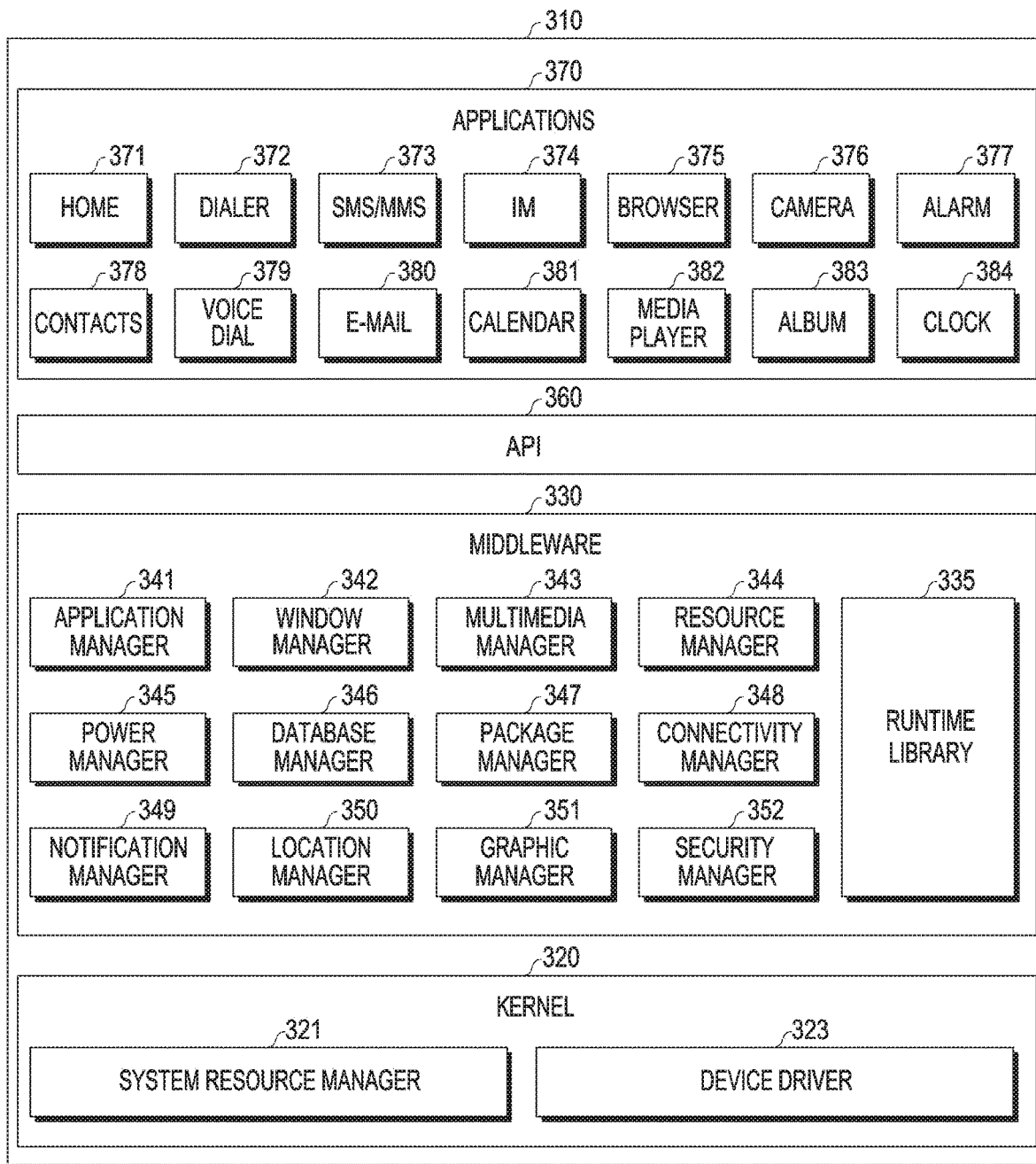
FIG. 3 is a block diagram of a program module according to various embodiments of the present disclosure.

FIG. 3 is a block diagram of a program module, according to various embodiments. According to an embodiment, the program module 310 (e.g., the programs 140) may include an operating system (OS) for controlling resources related to the electronic device (e.g., the electronic device 101) and/or various applications (e.g., the application programs 147) that are operated under the operating system. For example, the operating system may be Android, iOS, Windows, Symbian, Tizen, Bada, or the like.

The program module 310 may include a kernel 320, middleware 330, an application programming interface (API) 360, and/or applications 370. At least some of the program module 310 may be preloaded in the electronic device, or may be downloaded from external electronic devices (e.g., the electronic devices 102 and 104 or the server 106).

The kernel 320 (e.g., the kernel 141), for example, may include a system resource manager 321 and/or a device driver 323. The system resource manager 321 may perform control, allocation, or collection of the system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide functions required in common for the applications 370, or may provide the applications 370 with various functions through the API 360 in order to allow the applications 370 to effectively use the limited system resources in the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335, for example, may include a library module that a compiler uses in order to add new functions through programming languages while the applications 370 are executed. The runtime library 335 may perform the input/output management, the memory management, or a function of an arithmetic calculation.

The application manager 341, for example, may manage a life cycle of at least one of the applications 370. The window manager 342 may manage a GUI resource used in the screen. The multimedia manager 343 may identify formats for reproducing various media files, and may perform encoding or decoding of media files using a codec corresponding to each format. The resource manager 344 may manage resources, such as a source code, a memory, or a storage space of at least one of the applications 370.

The power manager 345, for example, may manage a battery or power by operating in association with a basic input/output system (BIOS), and may provide power information necessary for the operation of the electronic device. The database manager 346 may create, retrieve, or change a database that is to be used in at least one of the applications 370. The package manager 347 may manage the installation or update of the applications that are distributed in the form of a package file.

The connectivity manager 348, for example, may manage a wireless connection, such as Wi-Fi or Bluetooth. The notification manager 349 may display or notify of events, such as received messages, appointments, or proximity notifications, to the user without disturbance. The location manager 350 may manage location information of the electronic device. The graphic manager 351 may manage graphic effects to be provided to the user or user interfaces related thereto. The security manager 352 may provide a general security function required for system security or user authentication. According to an embodiment, in the case of the electronic device (e.g., the electronic device 101) adopting a phone call function, the middleware 330 may further include a telephony manager for managing the functions of a voice call or a video call of the electronic device.

The middleware 330 may include a middleware module through a combination of various functions of the above-described elements. The middleware 330 may provide a module that is specialized according to the type of operating system in order to provide differentiated functions. In addition, the middleware 330 may dynamically exclude some of the typical elements or add new elements.

The API 360 (e.g., the API 145), for example, may be a group of API programming functions, and may be provided as a different configuration according to an operating system. For example, one set of APIs may be provided to each platform in the case of Android or iOS, and two or more sets of APIs may be provided to each platform in the case of Tizen.

The applications 370 (e.g., the application programs 147) may include one or more applications that execute functions of home 371, a dialer 372, SMS/MMS 373, instant messages 374, a browser 375, a camera 376, an alarm 377, contacts 378, a voice dial 379, e-mail 380, a calendar 381, a media player 382, an album 383, a clock 384, healthcare (e.g., measuring the amount of exercise or blood glucose), providing environment information (e.g., providing atmospheric pressure, humidity, or temperature information), or the like.

According to an embodiment, the applications 370 may include an application (hereinafter, referred to as "information-exchange application" for the convenience of explanation) that supports the exchange of information between the electronic device (e.g., the electronic device 101) and the external electronic device (e.g., the electronic device 102 or 104). The information-exchange application, for example, may include a notification relay application for relaying specific information to the external electronic devices, or may include a device management application for managing the external electronic devices.

For example, the notification relay application may include a function of transferring notification information generated in other applications (e.g., the SMS/MMS application, the e-mail application, the healthcare application, or the environment information application) of the electronic device to the external electronic devices (e.g., the electronic devices 102 and 104). In addition, the notification relay application, for example, may receive notification information from the external electronic device to then provide the same to the user.

The device management application, for example, may manage (e.g., install, delete, or update): one or more functions {e.g., turning on and off the external electronic device (or some elements) or adjusting the brightness (or resolution) of a display} of the external electronic device (e.g., the electronic device 102 or 104) that communicates with the electronic device; applications executed in the external electronic device; or services (e.g., a phone call service or a messaging service) provided by the external electronic device.

According to an embodiment, the applications 370 may include applications that are designated according to the attributes (e.g., the healthcare application of a mobile medical device) of the external electronic device (e.g., the electronic device 102 or 104). According to an embodiment, the applications 370 may include applications that are received from the external electronic device (e.g., the server 106 or the electronic device 102 or 104). According to an embodiment, the applications 370 may include preloaded applications or third party applications that may be downloaded from a server. The names of the elements of the program module 310, according to the embodiment, may vary depending on the type of operating system.

According to various embodiments, at least some of the program module 310 may be implemented by software, firmware, hardware, or a combination thereof. At least some of the program module 310, for example, may be implemented (e.g., executed) by the processor (e.g., the processor 120). At least some of the program module 310, for example, may include modules, programs, routines, sets of instructions, or processors for executing one or more functions.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Figure 4:
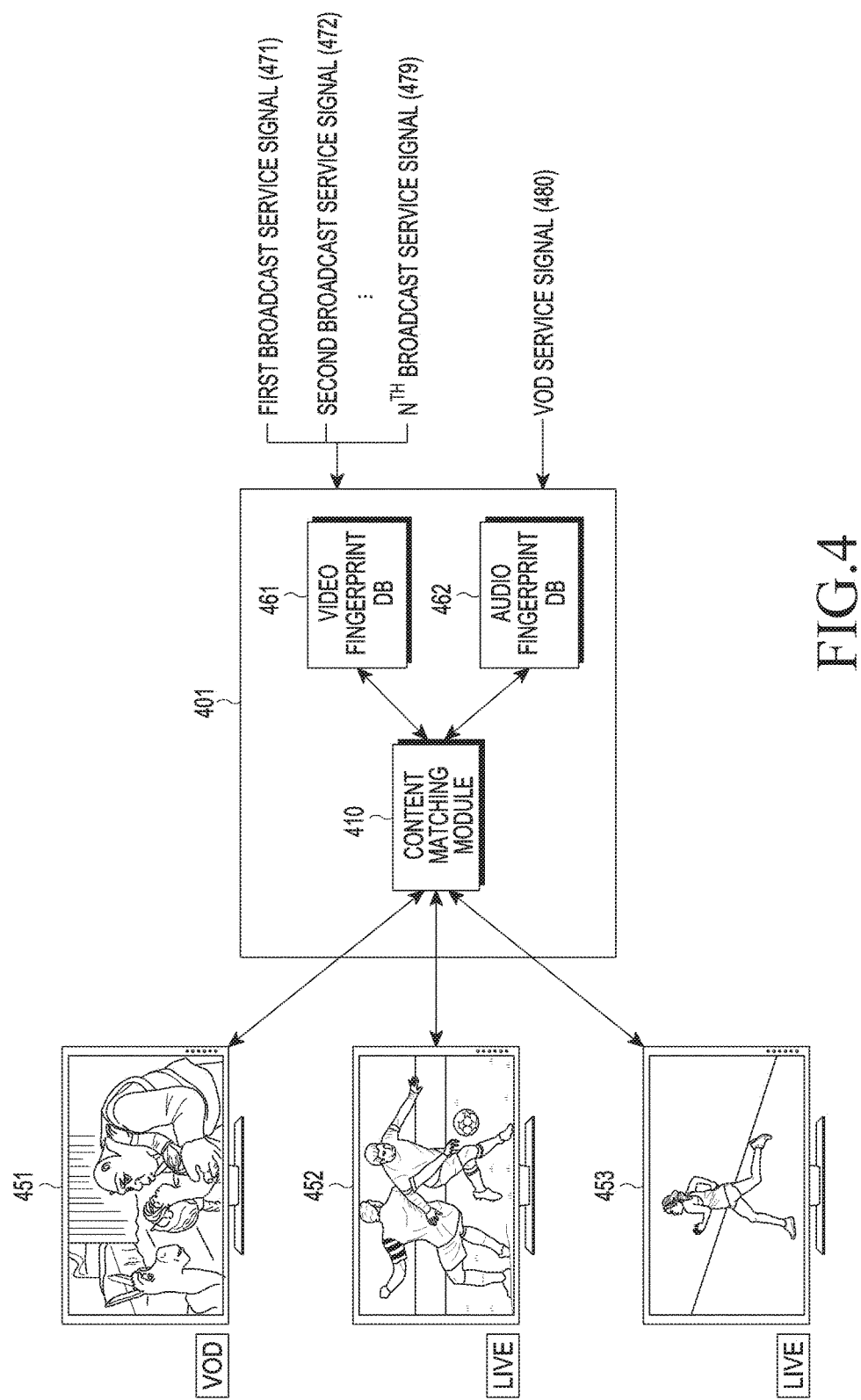
FIG. 4 is a conceptual diagram for content recognition according to various embodiments of the present disclosure.

FIG. 4 is a conceptual diagram for content recognition according to various embodiments of the present disclosure.

The content recognition apparatus 401 may recognize content according to a content recognition request transmitted from each of a plurality of electronic devices 451, 452, and 453. The content recognition apparatus 401 may include the same configuration as the above-described electronic device 101 or 201, or may include some thereof. The content recognition apparatus 401 may receive at least one of a video fingerprint and an audio fingerprint according to a content recognition request for content recognition from each of a plurality of electronic devices such as the first electronic device 451, the second electronic device 452, and the third electronic device 453. The content recognition apparatus 401 may receive at least one broadcast service signal (e.g., at least one of a plurality of broadcast service signals 471, 472, and 479 and a video-on-demand (VOD) service signal 480). Based on the received broadcast service signal, the content recognition apparatus 401, for example, may extract a video fingerprint and an audio fingerprint according to the broadcast service signal. Here video fingerprint extraction and audio fingerprint extraction may mean video fingerprint generation and audio fingerprint generation. The content recognition apparatus 401 may configure the extracted video fingerprint and audio fingerprint as a database. Accordingly, the content recognition apparatus 401 may store a video fingerprint database 461 for the extracted video fingerprint in the memory 130 or 230, and may store an audio fingerprint database 462 for the extracted audio fingerprint in the memory 130 or 230. Based on the stored video fingerprint database 461 and audio fingerprint database 462, the content recognition apparatus 401 may determine content matching the video fingerprint and the audio fingerprint according to a content recognition request, respectively. For example, a content matching module 410 of the content recognition apparatus 401 may retrieve a video fingerprint and an audio fingerprint that match the video fingerprint and the audio fingerprint according to a content recognition request, respectively, from the stored video fingerprint database 461 and audio fingerprint database 462. The content recognition apparatus 401 may transmit content recognition information on the matching content as a result of the content recognition to the electronic devices (e.g., the first electronic device 451, the second electronic device 452, and third electronic device 453) corresponding to the content recognition request. Accordingly, the electronic devices (e.g., the first electronic device 451, the second electronic device 452, and the third electronic device 453) may receive content recognition information, as a response to the content recognition request, and may output the received content recognition information.

Figure 5:
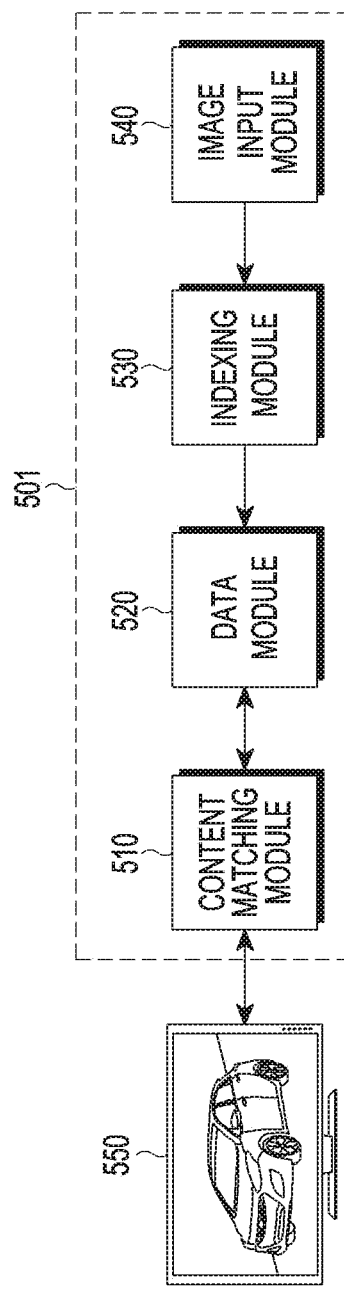
FIG. 5 is a block diagram of a content recognition apparatus according to various embodiments of the present disclosure.

FIG. 5 is a block diagram of a content recognition apparatus according to various embodiments of the present disclosure.

The content recognition apparatus 501 may include a content matching module 510, a data module 520, an indexing module 530, and an image input module 540. The content recognition apparatus 501 may be the electronic device (e.g., 101 or 201) or the content recognition apparatus 401, which has been described above.

The content matching module 510 may determine content that matches at least one of a video fingerprint and an audio fingerprint according to a content recognition request. For example, the content matching module 510, based on a video fingerprint database and an audio fingerprint database stored in the data module 520, may determine content matching at least one of the video fingerprint and the audio fingerprint according to a content recognition request received from the electronic device 550.

The data module 520 may store at least one of a video fingerprint and an audio fingerprint, which are generated for at least one broadcast service signal. For example, the data module 520 may store at least one of an indexed video fingerprint and audio fingerprint.

The indexing module 530 may index a video signal and an audio signal, respectively. The indexing module 530, based on a video signal according to a transmitted image signal, may generate a video fingerprint, and, based on an audio signal according to the transmitted image signal, may generate an audio fingerprint. Here, video fingerprint generation and audio fingerprint generation may mean video fingerprint extraction and audio fingerprint extraction. The indexing module 530 may generate a video fingerprint and an audio fingerprint using various known methods.

The indexing module 530 may index each of the generated video and audio fingerprints. The indexing module 530 may detect a section in which at least one of the video fingerprint or the audio fingerprint is in the multi-matching state, and may perform re-indexing for the multi-matching section. Here, multi-matching may mean that a video fingerprint is the same as or similar to other video fingerprints, or that an audio fingerprint is the same as or similar to other audio fingerprints.

The indexing module 530 may transfer the indexed video and audio fingerprints to the data module 520.

The image input module 540 may receive at least one broadcast service signal. The image input module 540 may separate the received broadcast service signal into a video signal and an audio signal. The image input module 540 may transmit the separated video and audio signals to the indexing module 530.

Each of the content matching module 510, the data module 520, the indexing module 530, and the image input module 540 described above may be configured as a single electronic device or server, or may be configured as a plurality of electronic devices or servers.

The content recognition apparatus according to various embodiments may include a configuration for a real-time broadcast service and a configuration for a media content service, respectively.

This will be described in detail with reference to FIG. 6.

Figure 6:
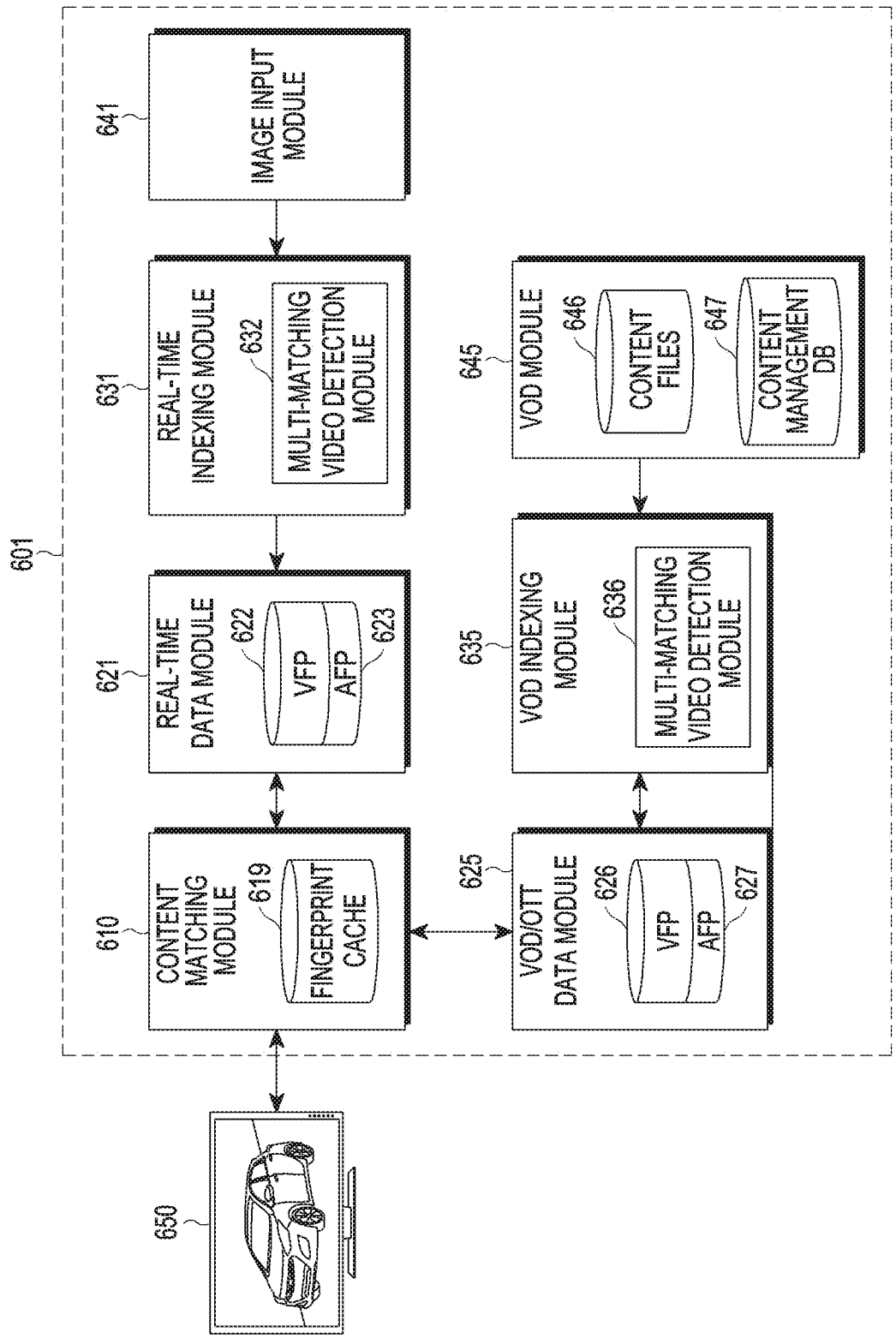
FIG. 6 is a block diagram of a content recognition apparatus according to various embodiments of the present disclosure.

FIG. 6 is a block diagram of a content recognition apparatus according to various embodiments of the present disclosure.

The content recognition apparatus 601 may include a content matching module 610, a real-time data module 621, a VOD/OTT (Over The Top) data module 625, a real-time indexing module 631, a VOD indexing module 635, an image input module 641, and a VOD module 645. The content recognition apparatus 601 may be one or more of the electronic devices (e.g., 101 and 201) or the content recognition apparatus (e.g., 401 and 501), which have been described above.

The content matching module 610 may determine content that matches at least one of a video fingerprint and an audio fingerprint according to a content recognition request. For example, the content matching module 610 may retrieve a video fingerprint and an audio fingerprint, which match the video fingerprint and the audio fingerprint according to the content recognition request received from the electronic device 650, from a video fingerprint database and an audio fingerprint database stored in the real-time data module 621 and the VOD/OTT data module 625, respectively, and, based on the retrieved result, may determine content matching the content recognition request. The matching method of the content matching module 610 for each of the video fingerprint and the audio fingerprint may be performed using various known methods.

The real-time data module 621 may store video fingerprints and audio fingerprints generated for at least one real-time broadcast service signal. For example, the real-time data module 621 may store an indexed video fingerprint of a video for the real-time broadcast service in a video fingerprint database 622, and may store an indexed audio fingerprint of an audio for the real-time broadcast service in an audio fingerprint database 623.

The VOD/OTT data module 625 may store the generated video and audio fingerprints for at least one media content service. For example, the VOD/OTT data module 625 may store an indexed video fingerprint of a video for a media content service (e.g., Video On Demand or Over The Top) in the video fingerprint database 626, and may store an indexed audio fingerprint of an audio for the media content service in the audio fingerprint database 627.

The real-time indexing module 631 may index each of the video and audio for the real-time broadcast service. The real-time indexing module 631, based on a video signal according to a transmitted image signal, may generate a video fingerprint, and, based on an audio signal according to the transmitted image signal, may generate an audio fingerprint. The real-time indexing module 631 may index each of the generated video and audio fingerprints. For example, a multi-matching video detection module 632 of the real-time indexing module 631 may detect a section in which a video or an audio of the real-time broadcast service is in the multi-matching state. The real-time indexing module 631 may perform re-indexing for the multi-matching section. The real-time indexing module 631 may transfer the indexed video and audio fingerprints to the real-time data module 621.

The VOD indexing module 635 may index a video and an audio of the media content service, respectively. The VOD indexing module 635, based on a video signal according to a transmitted image signal, may generate a video fingerprint, and, based on an audio signal according to the transmitted image signal, may generate an audio fingerprint. The VOD indexing module 635 may index each of the generated video and audio fingerprints. For example, a multi-matching video detection module 636 of the VOD indexing module 635 may detect a section in which a video fingerprint or an audio fingerprint of the media content service is in the multi-matching state. The VOD indexing module 635 may perform re-indexing for the multi-matching section. The VOD indexing module 635 may transfer the indexed video and audio fingerprints to the VOD/OTT data module 625.

The image input module 641 may receive at least one real-time broadcast service signal. The image input module 641 may separate the received real-time broadcast service signal into a video signal and an audio signal. The image input module 641 may transfer the separated video and audio signals to the real-time indexing module 631.

The VOD module 645 may receive data on at least one piece of media content, and may store at least one piece of media content. For example, the VOD module 645 may store content files 646 for at least one piece of content, and may manage and store a content management database 647 on the stored content.

Each of the content matching module 610, the real-time data module 621, the VOD/OTT data module 625, the real-time indexing module 631, the VOD indexing module 635, the image input module 641, and the VOD module 645 described above may be configured as a single electronic device or server, or may be configured as a plurality of electronic devices or servers.

The content recognition apparatus according to various embodiments may determine content matching both the video fingerprint and the audio fingerprint according to a content recognition request, and, if there is a plurality of pieces of content matching the video fingerprint according to the content recognition request, the content recognition apparatus may determine matching content using the audio fingerprint.

An operation in which the content recognition apparatus, according to various embodiments of the present disclosure, determines content matching both the video fingerprint and the audio fingerprint according to the content recognition request will be described with reference to FIGS. 7 and 8.

Figure 7:
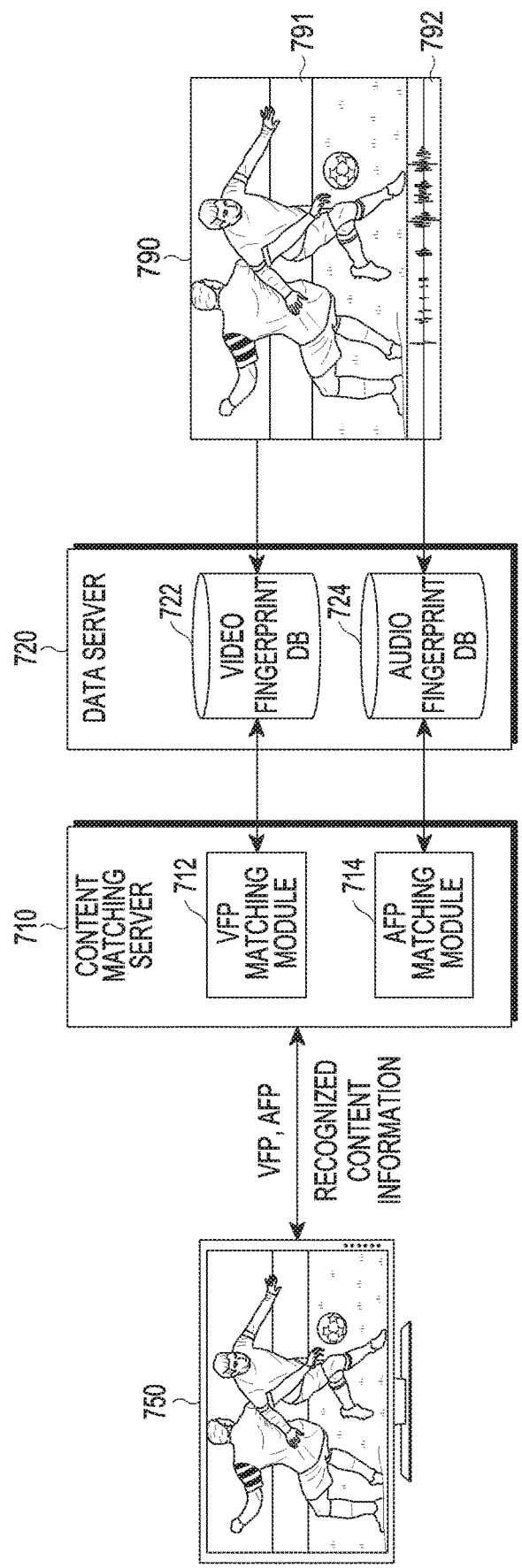
FIG. 7 is a conceptual diagram for content recognition according to various embodiments of the present disclosure.

FIG. 7 is a conceptual diagram for content recognition according to various embodiments of the present disclosure.

A content matching server 710 and a data server 720 may be the content recognition apparatus 401, 501, or 601 described above.

The data server 720 may obtain at least one broadcast service signal, and may generate a video fingerprint and an audio fingerprint for each of video and audio signals of the obtained broadcast service signal. For example, the data server 720 may generate a video fingerprint from a video signal 791 separated from the broadcast service signal 790, and may generate an audio fingerprint from an audio signal 792 separated from the broadcast service signal 790. The data server 720 may store the generated video fingerprint in a video fingerprint database 722, and may store the generated audio fingerprint in an audio fingerprint database 724.

The electronic device 750 may obtain a content recognition request for at least one piece of content, and may transmit, to the content matching server 710, a video fingerprint and an audio fingerprint of content corresponding to the content recognition request.

The content matching server 710 may determine content matching each of the video fingerprint and audio fingerprint corresponding to the content recognition request received from the electronic device 750. For example, a video fingerprint (VFP) matching module 712 of the content matching server 710 may retrieve a video fingerprint matching the video fingerprint of the content recognition request from the video fingerprint database 722 stored in the data server 720, and an audio fingerprint (AFP) matching module 714 may retrieve an audio fingerprint matching the audio fingerprint of the content recognition request from the audio fingerprint database 724 stored in the data server 720. The content matching server 710, based on the retrieved result, may determine the content that matches the content recognition request. The VFP matching module 712 and the AFP matching module 714 may be included in the content matching module 510 described above.

Figure 8:
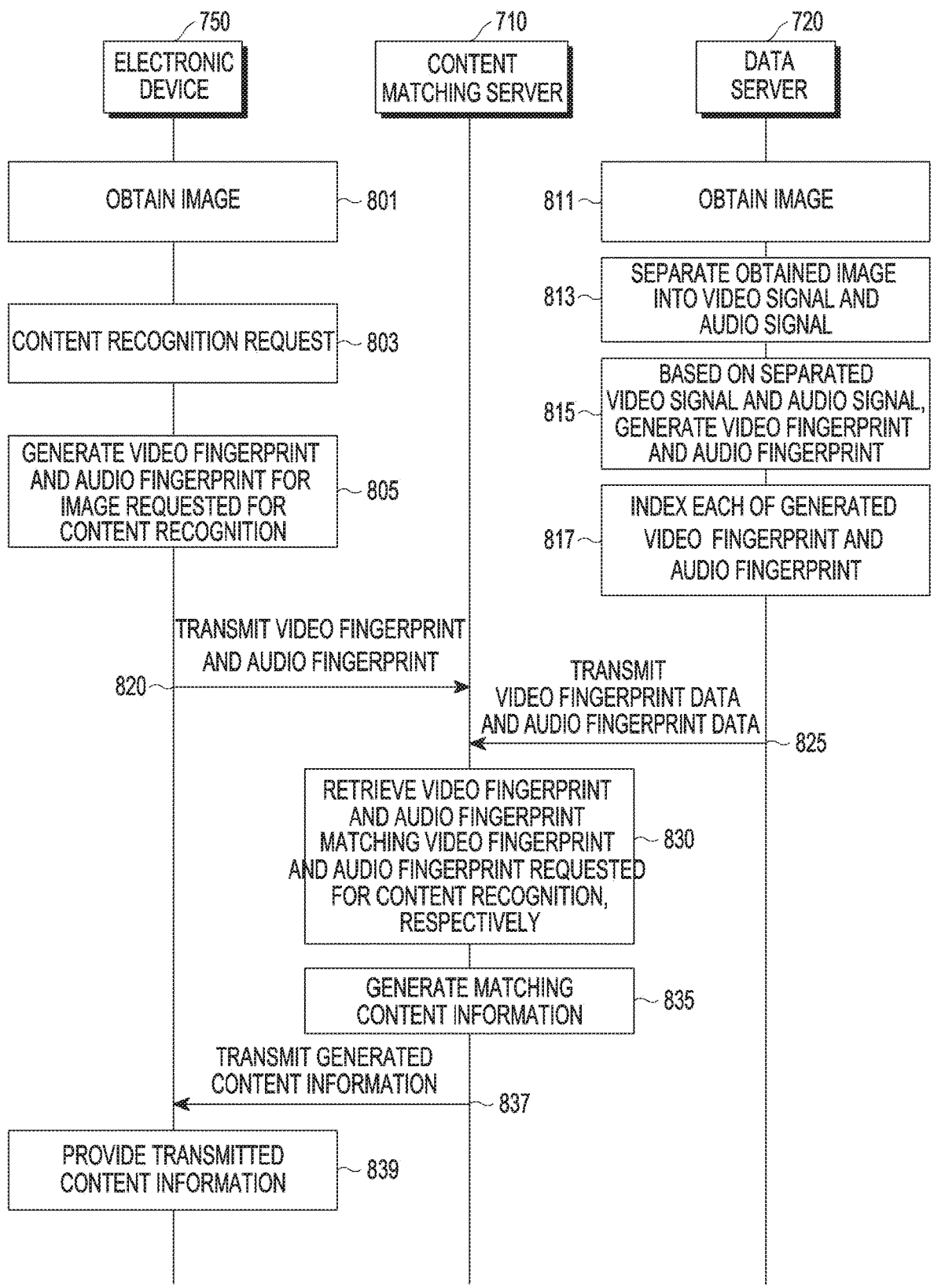
FIG. 8 is a flowchart of a content recognition operation according to various embodiments of the present disclosure.

FIG. 8 is a flowchart of a content recognition operation according to various embodiments of the present disclosure.

In operation 801, the electronic device 750 may obtain an image according to at least one broadcast service signal. In operation 803, the electronic device 750 (e.g., the processor 120 or 210) may obtain a content recognition request. In operation 805, the electronic device 750 (e.g., the processor 120 or 210) may generate a video fingerprint and an audio fingerprint for the image requested for the content recognition. In operation 820, the electronic device 750 may transmit, to the content matching server 710, the video and audio fingerprints generated according to the content recognition request.

In operation 811, the data server 720 (e.g., the image input module 540) may obtain an image according to at least one broadcast service signal. In operation 813, the data server 720 (e.g., the image input module 540) may separate the obtained image into a video signal and an audio signal. In operation 815, the data server 720 (e.g., the indexing module 530), based on the separated video and audio signals, may generate a video fingerprint and an audio fingerprint, respectively. In operation 817, the data server 720 (e.g., the indexing module 530) may index the generated video fingerprint and audio fingerprint, respectively. The data server 720 may store the indexed video and audio fingerprints in the data module 520. In operation 825, the data server 720 may transmit, to the content matching server 710, video fingerprint data on the indexed video fingerprint and audio fingerprint data on the indexed audio fingerprint.

In operation 830, the content matching server 710 (e.g., the content matching module 510) may retrieve a video fingerprint and an audio fingerprint matching the video fingerprint and the audio fingerprint, respectively, for the image requested for content recognition by the electronic device 750 from the video fingerprint data and audio fingerprint data transmitted from the data server 720. The content matching module 510 may simultaneously or sequentially retrieve the video fingerprint and the audio fingerprint. In operation 835, the content matching server 710 (e.g., the content matching module 510) may generate content information corresponding to the matching video and audio fingerprints. The content information may include a variety of information related to the content. For example, the content information may include at least one of a content title, a content playback time, a content type, a content provider, content, and main characters of the content. In operation 837, the content matching server 710 may transmit the generated content information to the electronic device 750.

In operation 839, the electronic device 750, based on the transmitted content information, may provide content information corresponding to the content recognition request. For example, the electronic device 750 (e.g., the processor 120 or 210) may display the content information on the display 160 or 260, and may output the content information through the speaker 282. Further, the electronic device 750 may output the content information in various ways, in addition to the output method described above.

An operation in which the content recognition apparatus, according to various embodiments of the present disclosure, determines content through audio fingerprint matching if a video fingerprint is in the multi-matching state after video fingerprint matching according to a content recognition request will be described with reference to FIGS. 9 and 10.

Figure 9:
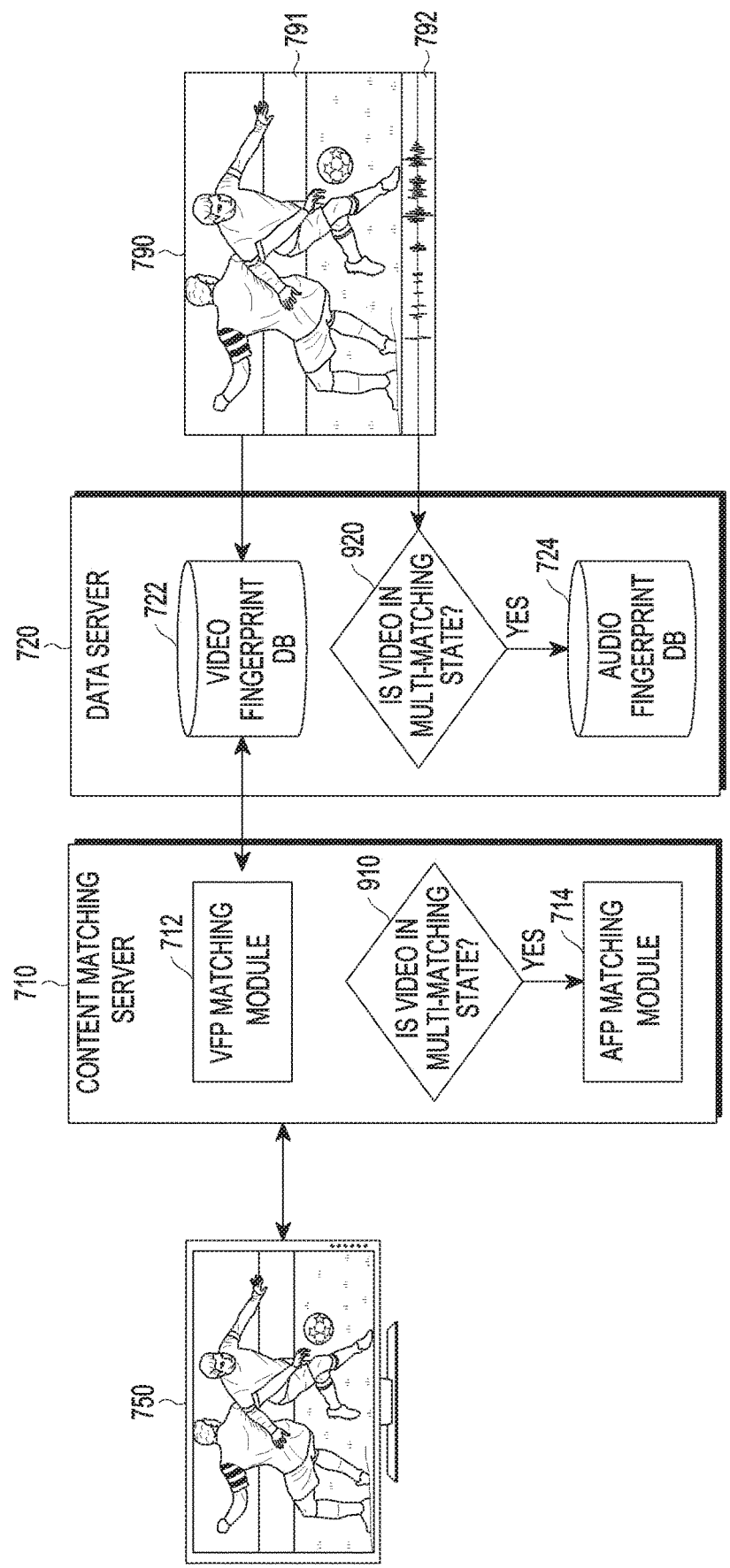
FIG. 9 is a conceptual diagram for content recognition according to various embodiments of the present disclosure.

FIG. 9 is a conceptual diagram for content recognition according to various embodiments of the present disclosure.

The content matching server 710 and the data server 720 may be the content recognition apparatus 401, 501, or 601 described above.

The data server 720 may obtain at least one broadcast service signal, and may generate a video fingerprint and an audio fingerprint for the video and audio signals of the obtained broadcast service signal, respectively. For example, the data server 720 may generate a video fingerprint from the video signal 791 separated from the broadcast service signal 790, and may determine whether or not the generated video fingerprint is in the multi-matching state. As a result of the determination, if the generated video fingerprint is not in the multi-matching state, the data server 720 may store only the video fingerprint in the video fingerprint database 722. If the generated video fingerprint is in the multi-matching state as a result of the determination, the data server 720 may generate an audio fingerprint from the audio signal 792 separated from the broadcast service signal 790 in operation 920. Here, the data server 720 may generate an audio fingerprint only for a section in which the video fingerprint is in the multi-matching state. The data server 720 may store the generated audio fingerprint in the audio fingerprint database 724.

The electronic device 750 may obtain a content recognition request for at least one piece of content, and may transmit, to the content matching server 710, a video fingerprint and an audio fingerprint of the content corresponding to the content recognition request.

The content matching server 710 may determine the content corresponding to the content recognition request. For example, the VFP matching module 712 of the content matching server 710, based on the video fingerprint database 722 stored in the data server 720, may retrieve a video fingerprint matching the video fingerprint corresponding to the content recognition request. As a result of the determination, if there is one piece of content matching the video fingerprint, the content matching server 710 may transmit content information on the matching content to the electronic device 750. In operation 910, if the video fingerprint is in a multi-matching state in which the video fingerprint matches a plurality of pieces of content as a result of determination by the VFP matching module 712 of the content matching server 710, the AFP matching module 714, based on the audio fingerprint database 724 stored in the data server 720, may retrieve an audio fingerprint matching the audio fingerprint corresponding to the content recognition request. Accordingly, the content matching server 710 may transmit, to the electronic device 750, content information on the matching content according to the matching result for each of the video fingerprint and the audio fingerprint. The VFP matching module 712 and the AFP matching module 714 may be included in the content matching module 510 described above.

Figure 10:
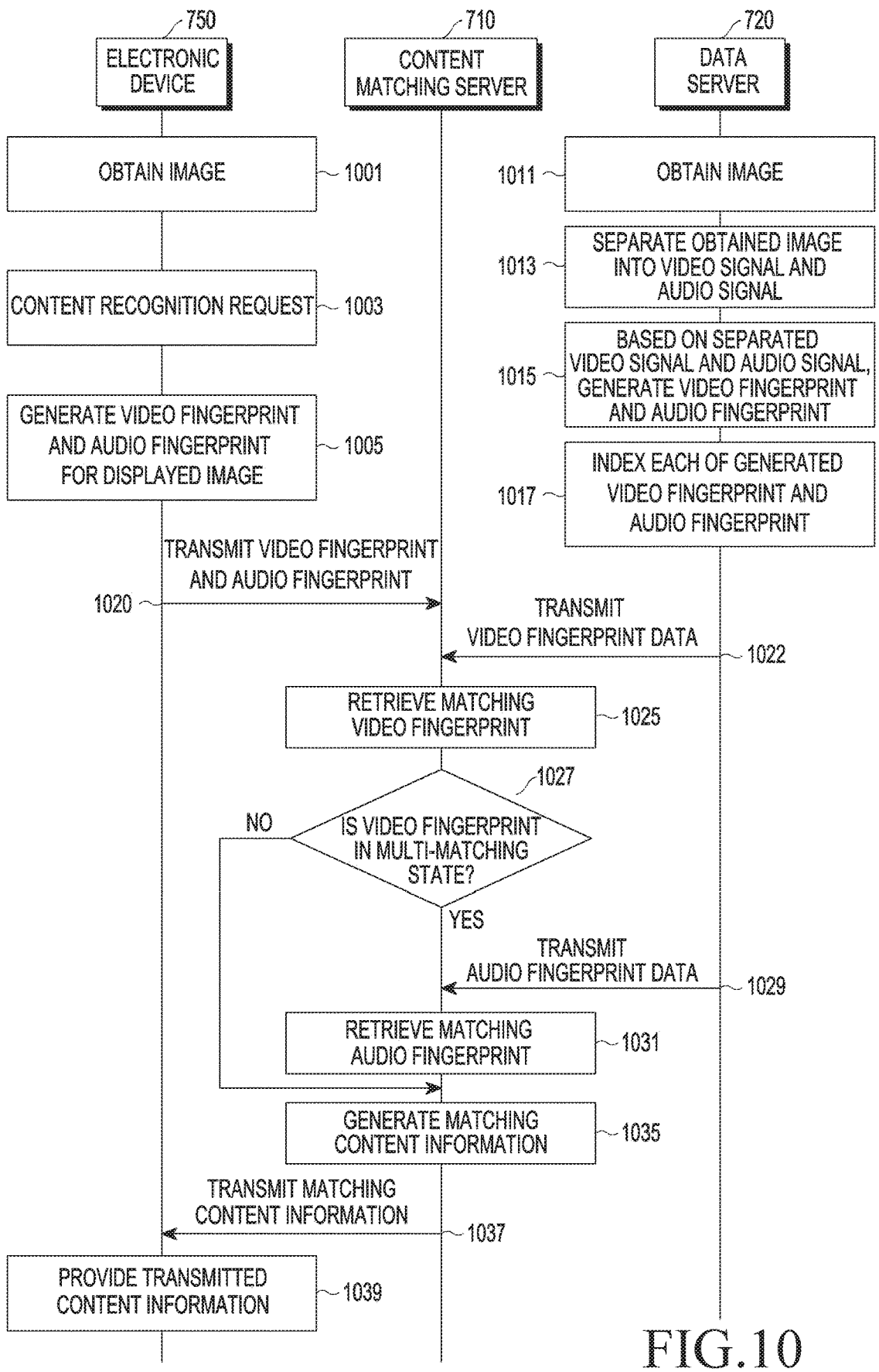
FIG. 10 is a flowchart of a content recognition operation according to various embodiments of the present disclosure.

FIG. 10 is a flowchart of a content recognition operation according to various embodiments of the present disclosure.

In operation 1001, the electronic device 750 may obtain an image according to at least one broadcast service signal. In operation 1003, the electronic device 750 (e.g., the processor 210) may obtain a content recognition request. In operation 1005, the electronic device 750 (e.g., the processor 120 or 210) may generate a video fingerprint and an audio fingerprint for the image requested for content recognition. In operation 1020, the electronic device 750 may transmit, to the content matching server 710, the video and audio fingerprints generated according to the content recognition request.

In operation 1011, the data server 720 (e.g., the image input module 540) may obtain an image according to at least one broadcast service signal. In operation 1013, the data server 720 (e.g., the image input module 540) may separate the obtained image into a video signal and an audio signal. In operation 1015, the data server 720 (e.g., the indexing module 530), based on the separated video and audio signals, may generate a video fingerprint and an audio fingerprint, respectively. The indexing module 530 may generate an audio fingerprint only for a section in which the video fingerprint is in the multi-matching state. An operation, in which the data server 720 (e.g., the indexing module 530), for example, generates an audio fingerprint only for a section in which the video fingerprint is in the multi-matching state, will be described later. In operation 1017, the data server 720 (e.g., the indexing module 530) may index the generated video fingerprint and audio fingerprint, respectively. The data server 720 may store the indexed video and audio fingerprints in the data module 520. In operation 1022, the data server 720 may transmit, to the content matching server 710, video fingerprint data on the indexed video fingerprint. For example, the data server 720 may transmit, to the content matching server 710, video fingerprint data for the entire section or a specific section. In addition, in response to request of the content matching server 710, the data server 720 may transmit the video fingerprint data corresponding to the requested section.

In operation 1025, the content matching server 710 (e.g., the content matching module 510) may retrieve a video fingerprint matching the video fingerprint for the image requested for content recognition by the electronic device 750 from the video fingerprint data transmitted from the data server 720. In operation 1027, the content matching server 710 (e.g., the content matching module 510) may determine whether or not the video fingerprint is in the multi-matching state. If the video fingerprint is in the multi-matching state, the content matching server 710 may receive audio fingerprint data from the data server 720 in operation 1029. The data server 720 may transmit, to the content matching server 710, audio fingerprint data corresponding to the multi-matching section of the video fingerprint, which is requested by the content matching server 710. In operation 1031, the content matching server 710 (e.g., the content matching module 510) may retrieve an audio fingerprint matching the audio fingerprint for the image requested for content recognition by the electronic device 750 from the audio fingerprint data transmitted from the data server 720. In operation 1035, the content matching server 710 (e.g., the content matching module 510) may generate content information corresponding to at least one of the retrieved video fingerprint and audio fingerprint. For example, if the video fingerprint is not in the single-matching state in operation 1027, the content matching server 710 (e.g., the content matching module 510) may generate content information corresponding to the matching video fingerprint. As another example, if the video fingerprint is in the multi-matching state in operation 1027, and then if an audio fingerprint matching operation is performed, the content matching server 710 (e.g., the content matching module 510) may generate content information corresponding to the matching video fingerprint and audio fingerprint. The content information may include a variety of information related to the content. For example, the content information may include at least one of a content title, a content playback time, a content type, a content provider, content, and main characters of the content. In operation 1037, the content matching server 710 may transmit the generated content information to the electronic device 750.

In operation 1039, the electronic device 750, based on the transmitted content information, may provide content information corresponding to the content recognition request. For example, the electronic device 750 (e.g., the processor 120 or 210) may display the content information on the display 160 or 260, and may output the content information through the speaker 282. In addition, the electronic device 750 may output the content information in various ways in addition to the output method described above.

The content recognition apparatus according to various embodiments of the present disclosure, when generating the video fingerprint and the audio fingerprint from the video signal and the audio signal of the obtained broadcast service signal, may generate the audio fingerprint to then store the same in the audio fingerprint database only in the case where the generated video fingerprint is in the multi-matching state. This will be described with reference to FIG. 11.

Figure 11:
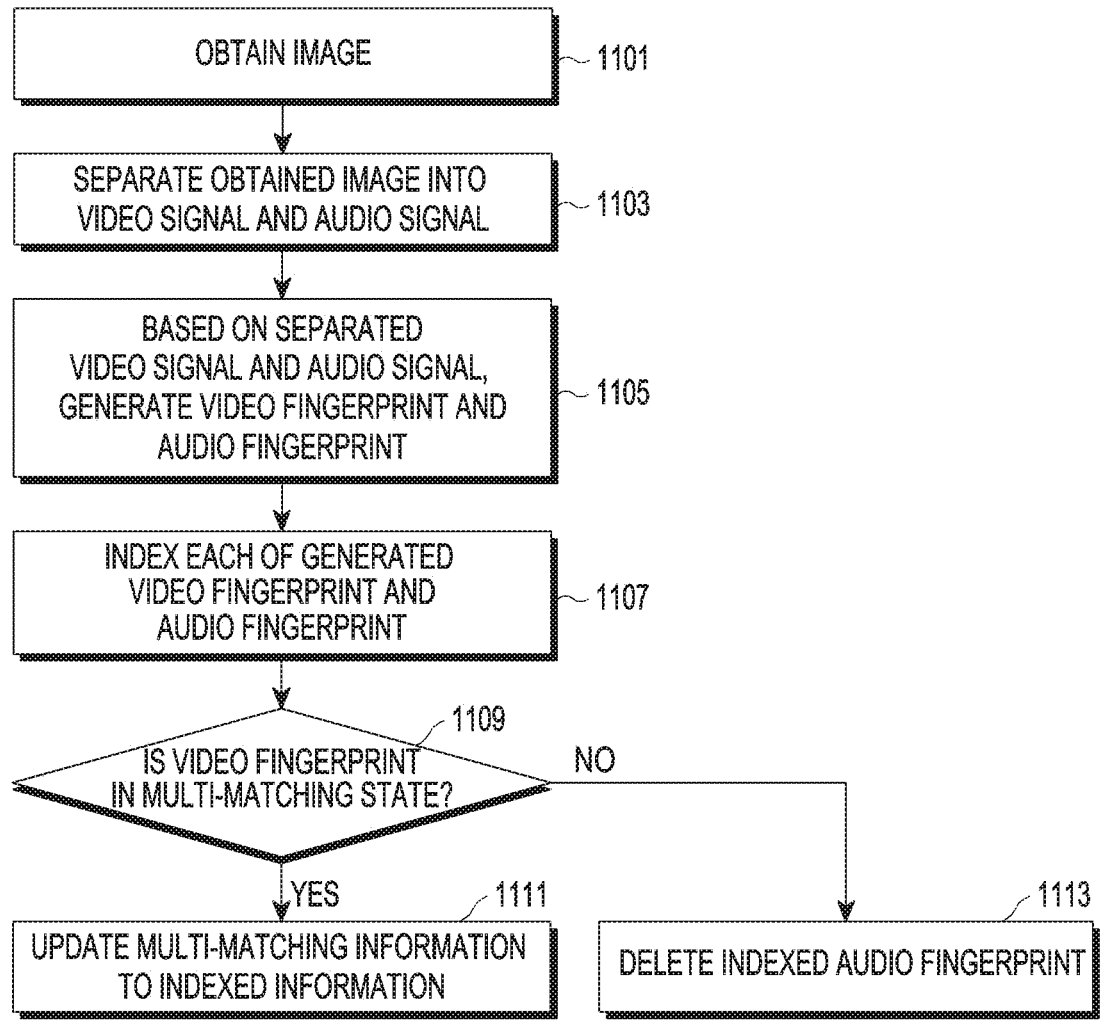
FIG. 11 is a flowchart of a fingerprint generation operation according to various embodiments of the present disclosure.

FIG. 11 is a flowchart of a fingerprint generation operation according to various embodiments of the present disclosure.

In operation 1101, the content recognition apparatus 501 (e.g., the image input module 540) may obtain an image for at least one broadcast service signal. In operation 1103, the content recognition apparatus 501 (e.g., the image input module 540) may separate the obtained image into a video signal and an audio signal. In operation 1105, the content recognition apparatus 501 (e.g., the indexing module 530), based on the separated video and audio signals, may generate a video fingerprint and an audio fingerprint, respectively. In operation 1107, the content recognition apparatus 501 (e.g., the indexing module 530) may index each of the generated video and audio fingerprints. In operation 1109, the content recognition apparatus 510 (e.g., the indexing module 530) may determine whether or not the generated video fingerprint is in the multi-matching state. Here, multi-matching may mean that the video fingerprint is the same as or similar to other video fingerprints or that the audio fingerprint is the same as or similar to other audio fingerprints. If the video fingerprint is in the multi-matching state, the content recognition apparatus 501 (e.g., the indexing module 530) may update multi-matching information to the indexed information in operation 1111. Accordingly, the indexing module 530 may perform re-indexing for the multi-matching section. The content recognition apparatus 510 (e.g., the data module 520) may store each of the generated video and audio fingerprints. If the video fingerprint is not in the multi-matching state, the content recognition apparatus 501 (e.g., the indexing module 530) may delete the indexed audio fingerprint in operation 1113. Accordingly, the content recognition apparatus 501 may not store the audio fingerprint for a section in which the video fingerprint is not in the multi-matching state. Accordingly, the content recognition apparatus 501 (e.g., the data module 520) may store the audio fingerprint only for the multi-matching section, and may not store the audio fingerprint for the non-multi-matching section.

As described above, the content recognition apparatus 401, 501, or 601, according to various embodiments of the present disclosure, can recognize the content that cannot be recognized only by the video fingerprint or the audio fingerprint, thereby providing accurate content information on the content. In addition, the present disclosure can perform a matching operation for each of the video fingerprint and the audio fingerprint, thereby increasing a content recognition rate and shortening a content recognition time. In addition, the present disclosure can store both the video fingerprint and the audio fingerprint only for a section or content in which one of either the video fingerprint or the audio fingerprint is in the multi-matching state, thereby reducing the use amount of a resource such as a processor and a memory.

The description of the content recognition operation using the above-described video and audio fingerprint matching is merely illustrative, and the present disclosure is not limited thereto. Accordingly, the video or audio fingerprint matching operation of the content recognition apparatus, according to various embodiments of the present disclosure, may be processed in various orders according to the selection of a user or a designer. Also, various known methods may be applied to the video and audio fingerprint generating methods, and various known methods may also be applied to the video and audio fingerprint matching methods.

A method for operating a content recognition apparatus, according to various embodiments of the present disclosure, may include: obtaining at least one of a video fingerprint and an audio fingerprint of content corresponding to a content recognition request; retrieving a video fingerprint or an audio fingerprint, which matches at least one of the obtained video fingerprint and audio fingerprint, from a video fingerprint database and an audio fingerprint database for at least one broadcast service signal; and providing content information corresponding to the retrieved video fingerprint or audio fingerprint.

In various embodiments of the present disclosure, the retrieving of a video fingerprint or an audio fingerprint, which matches at least one of the obtained video fingerprint and audio fingerprint, may include: retrieving a video fingerprint matching the obtained video fingerprint from the video fingerprint database; and if a plurality of video fingerprints matching the obtained video fingerprint are retrieved as a result of the retrieving, retrieving an audio fingerprint matching the obtained audio fingerprint from the audio fingerprint database.

In various embodiments of the present disclosure, the retrieving of a video fingerprint or an audio fingerprint, which matches at least one of the obtained video fingerprint and audio fingerprint, may include: retrieving an audio fingerprint matching the obtained audio fingerprint from the audio fingerprint database; and if a plurality of audio fingerprints matching the obtained audio fingerprint are retrieved as a result of the retrieving, retrieving a video fingerprint matching the obtained video fingerprint from the video fingerprint database.

In various embodiments of the present disclosure, the retrieving of a video fingerprint or an audio fingerprint, which matches at least one of the obtained video fingerprint and audio fingerprint, may include retrieving a video fingerprint and an audio fingerprint, which match the obtained video fingerprint and audio fingerprint, respectively, from the video fingerprint database and the audio fingerprint database.

In various embodiments of the present disclosure, the providing of content information corresponding to the retrieved video fingerprint or audio fingerprint may include providing content information on content matching the retrieved video fingerprint and audio fingerprint.

In various embodiments of the present disclosure, a method for operating a content recognition apparatus may include: receiving at least one broadcast service signal; generating a video fingerprint and an audio fingerprint for at least one broadcast server signal; determining whether or not at least one of the generated video fingerprint and audio fingerprint is in the multi-matching state; and based on the determination result, storing at least one of the generated video fingerprint and audio fingerprint.

In various embodiments of the present disclosure, the determining of whether or not at least one of the generated video fingerprint and audio fingerprint is in the multi-matching state may include determining whether or not at least one of the generated video fingerprint and audio fingerprint is the same as or similar to at least one of a video fingerprint and an audio fingerprint for another broadcast service signal.

In various embodiments of the present disclosure, the storing of at least one of the generated video fingerprint and audio fingerprint based on the determination result may include storing the generated video fingerprint and audio fingerprint, respectively, if at least one of the generated video fingerprint and audio fingerprint is in the multi-matching state.

In various embodiments of the present disclosure, the storing of at least one of the generated video fingerprint and audio fingerprint based on the determination result may include storing only one of the generated video fingerprint and audio fingerprint if at least one of the generated video fingerprint and audio fingerprint is not in the multi-matching state.

In various embodiments of the present disclosure, the method may further include indexing at least one of the generated video fingerprint and audio fingerprint.

In various embodiments of the present disclosure, the method may further include, if at least one of the generated video fingerprint and audio fingerprint is in the multi-matching state, re-indexing at least one of the generated video fingerprint and audio fingerprint.

In various embodiments of the present disclosure, a content recognition apparatus may include: a data storage module configured to store a video fingerprint database and an audio fingerprint database for at least one broadcast service signal; and a content matching module configured to obtain at least one of a video fingerprint and an audio fingerprint of content corresponding to a content recognition request, configured to retrieve a video fingerprint or an audio fingerprint, which matches at least one of the obtained video fingerprint and audio fingerprint, from a video fingerprint database and an audio fingerprint database stored in the data storage module, and configured to provide content information corresponding to the retrieved video fingerprint or audio fingerprint.

In various embodiments of the present disclosure, the content matching module may be configured to: retrieve a video fingerprint matching the obtained video fingerprint from the video fingerprint database; and if a plurality of video fingerprints matching the obtained video fingerprint are retrieved as a result of the retrieving, retrieve an audio fingerprint matching the obtained audio fingerprint from the audio fingerprint database.

In various embodiments of the present disclosure, a content matching module may be configured to: retrieve an audio fingerprint matching the obtained audio fingerprint from the audio fingerprint database; and if a plurality of audio fingerprints matching the obtained audio fingerprint are retrieved as a result of the retrieving, retrieve a video fingerprint matching the obtained video fingerprint from the video fingerprint database.

In various embodiments of the present disclosure, the content matching module may be configured to: retrieve a video fingerprint and an audio fingerprint, which match the obtained video fingerprint and audio fingerprint, respectively, from the stored video fingerprint database and audio fingerprint database.

In various embodiments of the present disclosure, the content matching module may be configured to provide content information on content matching the retrieved video fingerprint and audio fingerprint.

In various embodiments of the present disclosure, a content recognition apparatus may include: an image input module configured to receive at least one broadcast service signal; an indexing module configured to generate a video fingerprint and an audio fingerprint for the at least one broadcast service signal and configured to determine whether or not at least one of the generated video fingerprint and audio fingerprint is in the multi-matching state; and a data module configured to store at least one of the generated video fingerprint and audio fingerprint.

In various embodiments of the present disclosure, the indexing module may be configured to determine whether or not at least one of the generated video fingerprint and audio fingerprint is the same as or similar to at least one of a video fingerprint and an audio fingerprint for another broadcast service signal.

In various embodiments of the present disclosure, the data module is configured to store the generated video fingerprint and audio fingerprint, respectively, if at least one of the generated video fingerprint and audio fingerprint is in the multi-matching state.

In various embodiments of the present disclosure, the data module is configured to store only one of the generated video fingerprint and audio fingerprint if at least one of the generated video fingerprint and audio fingerprint is not in the multi-matching state.

In various embodiments of the present disclosure, the indexing module may be configured to index at least one of the generated video fingerprint and audio fingerprint.

In various embodiments of the present disclosure, the indexing module may be configured to re-index at least one of the generated video fingerprint and audio fingerprint if at least one of the generated video fingerprint and audio fingerprint is in the multi-matching state.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A method for operating a content recognition apparatus, the method comprising:
   receiving, from an external electronic device, a video fingerprint of content and an audio fingerprint of the content corresponding to a content recognition request at the external electronic device;
   retrieving at least one of a video fingerprint or an audio fingerprint, which matches at least one of the received video fingerprint and audio fingerprint, from a real-time video fingerprint database and a real-time audio fingerprint database or a VoD video fingerprint database and a VoD audio fingerprint database, based on a type of the content for at least one corresponding broadcast service signal or a corresponding VoD service signal; and
   providing, to the external electronic device, content information corresponding to the retrieved at least one of video fingerprint or audio fingerprint,
   wherein the retrieving of the at least one of the video fingerprint or the audio fingerprint, which matches the at least one of the received video fingerprint and audio fingerprint, comprises:
     retrieving a plurality of video fingerprints matching the received video fingerprint from the real-time video fingerprint database or the VoD video fingerprint database, and retrieving an audio fingerprint matching the received audio fingerprint from among audio fingerprints included in the real-time audio fingerprint database or the VoD audio fingerprint database that correspond to the plurality of video fingerprints matching the received video fingerprint; or
     retrieving a plurality of audio fingerprints matching the received audio fingerprint from the real-time audio fingerprint database or the VoD audio fingerprint database, and retrieving a video fingerprint matching the received video fingerprint from among video fingerprints included in the real-time video fingerprint database or the VoD video fingerprint database that correspond to the plurality of audio fingerprints matching the received audio fingerprint.

2. A content recognition apparatus comprising:
memory configured to store a real-time video fingerprint database, a real-time audio fingerprint database, a video on demand (VoD) video fingerprint database, and a VoD audio fingerprint database for at least one broadcast service signal and a VoD service signal; and
at least one processor configured to:
  receive, from an external electronic device, a video fingerprint and an audio fingerprint of content corresponding to a content recognition request at the external electronic device;
  retrieve at least one of a video fingerprint or an audio fingerprint, which matches at least one of the received video fingerprint and audio fingerprint, based on a type of the content, from the real-time video fingerprint database and the real-time audio fingerprint database or the VoD video fingerprint database and the VoD audio fingerprint database stored in the memory; and
  provide, to the external electronic device, content information corresponding to the retrieved at least one of video fingerprint or audio fingerprint,
wherein in the retrieving of the at least one of the video fingerprint or the audio fingerprint, which matches the at least one of the received video fingerprint and audio fingerprint, the at least one processor is configured to:
  retrieve a plurality of video fingerprints matching the received video fingerprint from the real-time video fingerprint database or the VoD video fingerprint database, retrieve an audio fingerprint matching the received audio fingerprint from among audio fingerprints included in the real-time audio fingerprint database or the VoD audio fingerprint database that correspond to the plurality of video fingerprints matching the received video fingerprint; or
  retrieve a plurality of audio fingerprints matching the received audio fingerprint from the real-time audio fingerprint database or the VoD audio fingerprint database, and retrieve a video fingerprint matching the received video fingerprint from among video fingerprints included in the real-time video fingerprint database or the VoD video fingerprint database that correspond to the plurality of audio fingerprints matching the received audio fingerprint.

* * * * *